March 12, 1963
J. SCHULTZ
3,080,795
CAM GENERATING MECHANISM
Filed July 16, 1959
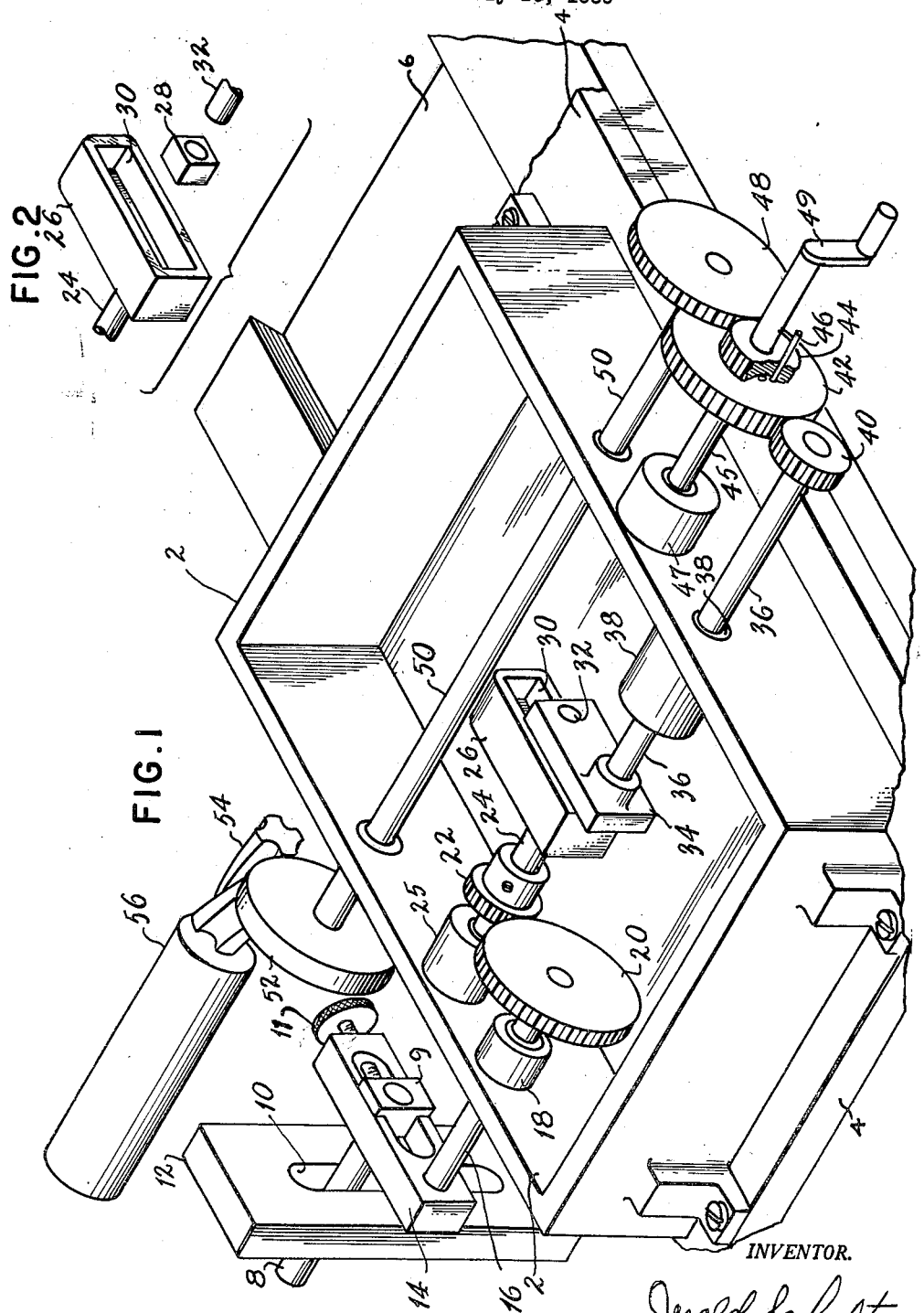
INVENTOR.
Jerald Schultz United States Patent Office 3,080,795
Patented Mar. 12, 1963

3,080,795
CAM GENERATING MECHANISM
Jerald Schultz, 530 E. 17th St., Brooklyn, N.Y.
Filed July 16, 1959, Ser. No. 827,517
3 Claims. (Cl. 90—18)

The invention is a mechanism which generates or develops circular cam contours having accelerating rises and decelerating falls that conform to a special modified harmonic motion displacement pattern.

One important object of the invention is to provide a means for machining a circular cam directly, without it being necessary to calculate, layout and machine small angular increments of various radii of which a rise or fall contour is composed. Present practice is to make a master cam or templet by taking a large number of small cuts of various radii and then blending the ensuing high spots or scallops by hand. From the master cam, a profile milling machine with a pantograph attachment or a cam milling machine, can produce duplicates. This invention is intended to eliminate the necessity for the master cam entirely.

Another object of the invention is to provide a relatively inexpensive means for efficiently machining cams having excellent dynamic performance characteristics.

With the above and other objects in view, the invention consists in general of certain novel details of construction and combinations of parts hereinafter described.

A preferred embodiment of the invention appears in the drawings in which:

FIGURE 1 is a perspective view of the invention showing housing 2 which is a five sided heavy metal box having four lugs or feet for mounting on a table 4 of a horizontal type milling machine. The table 4 moves back and forth in one plane in the dovetailed slide of the saddle 6 of the milling machine.

FIGURE 2 is an exploded perspective view of the stub shaft 24, slider bracket 26, slider block 28 and pin 32 of FIGURE 1.

An eccentric crank pin 8, engaged in slot 10 of bracket 12, is assembled integrally in adjustment slider block 9. Adjustment screw 11 engages a threaded hole in crank arm 14 and also engages block 9, thus controlling the blocks position and therefore the amount of eccentricity of the crank pin 8. Crank arm 14 is integrally mounted on crank shaft 16 which is supported by bearing 18 attached to housing 2. A gear 20 is integrally mounted on the end of crank shaft 16. Meshing with gear 20 is gear 22 having one half as many teeth as gear 20. Gear 22 is mounted integrally on shaft 24 which is supported by bearing 25 which is attached to the housing 2. Slider bracket 26 is fastened integrally to the end of stub shaft 24 and rotates 360 degrees about the axis of stub shaft 24. A slider block 28, shown in an exploded perspective view in FIGURE 2, engages a groove 30 in the slider bracket. A pin 32 which is secured integrally in a slider crank arm 34 engages the hole in the slider block, thus when the arm 34 rotates the bracket 26 is caused to rotate. The slider crank arm 34 is mounted integrally on the end of a jack shaft 36. The jack shaft is supported by a bearing 38 attached to the housing 2. At the other end of the jack shaft 36 there is a gear 40 mounted integrally to the shaft. Engaging gear 40 is gear 42 which is mounted on but free to rotate about shaft 45. Gear 42 has twice as many teeth as gear 40. Shaft 45 is supported by bearing 47 which is attached to housing 2. Gear 44 is mounted integrally on shaft 45. It has a hole through which pin 46 may engage one of several holes drilled on the same diameter in gear 42. Thus the pin 46 acts as a positive clutch between gears 42 and 44. By withdrawing the pin the two gears are declutched or disengaged. At the end of shaft 45 is a handle 49, by which the entire train may be motivated. Engaging gear 44 is gear 48, which is mounted integrally on shaft 50. Gear 48 has twice as many teeth as gear 44. Shaft 50 is supported by two bushed holes in either side of the housing. At its other extremity shaft 50 has a disc of metal fastened integrally to it. An end mill 54 is shown protruding from an arbor 56. The horizontal type milling machine which encompasses the arbor, the saddle and the table is not shown, but its functions are standard and should be familiar to anyone versed in the machine tool art.

Since the housing 2 is fastened integrally to the table 4, the housing and all the parts affixed to it are constrained to move in one horizontal plane by the saddle 6, because the table rides in a dovetailed slot of the saddle. The arbor and end mill cutter are square and perpendicular to the line of travel of the housing. The bracket 12 is affixed rigidly to a stationary part of the milling machine and is stationary relative to the arbor. The slot 10 is in a vertical position and perpendicular to the arbor. When shaft 16 rotates, force is exerted through the crank arm 14 and pin 8 against the slot 10 and consequently the housing and all with it are moved toward the cutter 54.

If shaft 16 were rotating with uniform motion in respect to handle 49 then the housing would move toward the cutter with regular harmonic acceleration motion, however, the speed of rotation of shaft 16 is varied. Because shaft 24 is horizontally displaced in relation to shaft 36, the slider crank arm 34 imparts a varying motion or speed to slider bracket 26 through the pin 32 and the slider block 28. One complete cycle of speed variation, in the ratio of two to one approximately, occurs for every complete revolution of shaft 24. The lower speed being timed to coincide with the beginning of the harmonic motion of the crank pin 8, it thereby modifies the motion so that the beginning of the movement is slower, the intermediate portion is faster and the end slower. Thus the initial and terminal acceleration forces incurred are much lower (one third) than they would be with a regular harmonic motion. This condition is favorable for high speed reciprocal motions.

The disc 52 is the workpiece or cam blank. When the handle 49 is rotated the workpiece will both rotate and advance into the cutter 54 which revolves when the milling machine is turned on. If the distance between pin 8 and shaft 16 is set at one inch by turning the adjustment screw 11, then during the time that the workpiece rotates ninety degrees it will also advance two inches towards the cutter. This is because the pin 8 rotates one hundred and eighty degrees during that time. If a dwell period is desired at this part of the cam, the clutch pin 46 must be removed, thus the workpiece will continue to be rotated but the crank pin 8 will remain stationary holding the housing stationary. With the gear arrangement shown, and with the clutch pin engaging gears 42 and 44, the workpiece will rotate one hundred and eighty degrees while the crank pin 8 rotates three hundred and sixty degrees. Thus one rise and one fall are generated in one half of the cam blank. To generate a rise and or fall in various periods other than one hundred and eighty degrees gears 44 and 48 must be interchanged with other change gears which correspond to the displacement period desired. For example, if gears 44 and 48 are equal or have the same amount of teeth, then the rise and fall will take place in one complete revolution of the workpiece. Handle 49 is shown as the motivator for simplicity. In practice a slow gearmotor will be used to drive shaft 45.

It is anticipated that if the variated speed crank part of the above described mechanism be applied to a power punch press, replacing the plain crank, that higher speeds will be attainable by the same piece of equipment.

The mechanism can be easily attached to most medium or heavy duty horizontal milling machines in the manner above described.

The mechanism can also be utilized to operate with a cam duplicating milling machine, on which it would take the place of the master cam former.

The mechanism and all its parts can readily be manufactured in steel and other suitable metals by any well equipped general machine shop.

With full belief that the details of the construction may be varied substantially without departing from the spirit of the invention and the exclusive use of those modifications coming within the scope of the claims being contemplated what I desire to claim in Letters Patent is:

1. Cam generating apparatus, comprising, a shaft adapted to support a cam blank, means rotatably supporting said shaft, means rotating said shaft; a cutter, means rotatably supporting said cutter at right angles to the plane of rotation of said cam blank; mechanism generating relative harmonic displacement between said cam supporting shaft and said cutter, said mechanism including a second shaft, means rotatably supporting said second shaft, means rotating said second shaft, said rotating means including means modifying the angular velocity of said second shaft to effect a substantial slow down in the relative harmonic movement between said cam supporting shaft and said cutter at the beginning and end of each harmonic stroke, and clutch means for selectively connecting and detaching said harmonic displacement generating mechanism from said first shaft rotating means.

2. Cam generating apparatus, comprising, a carriage, means supporting said carriage for reciprocal movement; a shaft adapted to support a cam blank, means rotatably supporting said shaft on said carriage, means rotating said shaft; a cutter, means rotatably supporting said cutter adjacent said carriage at right angles to the plane of rotation of said cam blank; mechanism imparting harmonic motion to said carriage, said mechanism including a second shaft, means rotatably supporting said second shaft on said carriage, means rotating said second shaft, said rotating means including means mounted on said carriage modifying the angular velocity of said second shaft to effect a substantial slow down in acceleration and deceleration of said carriage at the beginning and end of each harmonic stroke; and clutch means for selectively connecting and detaching said harmonic motion imparting mechanism and said first named shaft rotating means.

3. The apparatus of claim 2, wherein means are provided for varying the length of the reciprocal stroke of said carriage.

References Cited in the file of this patent

UNITED STATES PATENTS

| | | |
|---|---|---|
| 564,800 | Price | July 28, 1896 |
| 1,347,085 | Foster | July 20, 1920 |
| 2,534,231 | Christian et al. | Dec. 19, 1950 |
| 2,745,319 | Sawyer | May 15, 1956 |

FOREIGN PATENTS

| | | |
|---|---|---|
| 1,041,318 | Germany | Oct. 16, 1958 |